US010887479B2

(12) United States Patent
Lea et al.

(10) Patent No.: US 10,887,479 B2
(45) Date of Patent: Jan. 5, 2021

(54) MULTIFUNCTIONAL PERIPHERAL DEVICE DETECTING AND DISPLAYING SIGNATURE LINES WITHIN AN ELECTRONIC DOCUMENT

(71) Applicant: Hewlett-Packard Development Company. L.P., Houston, TX (US)

(72) Inventors: Perry V Lea, Eagle, ID (US); Eric P Christianson, Meridian, ID (US); Bradley R Larson, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 448 days.

(21) Appl. No.: 15/307,148

(22) PCT Filed: Apr. 28, 2014

(86) PCT No.: PCT/US2014/035741
§ 371 (c)(1),
(2) Date: Oct. 27, 2016

(87) PCT Pub. No.: WO2015/167436
PCT Pub. Date: Nov. 5, 2015

(65) Prior Publication Data
US 2017/0048406 A1 Feb. 16, 2017

(51) Int. Cl.
*H04N 1/00* (2006.01)
*H04N 1/32* (2006.01)
*G06K 9/00* (2006.01)
*H04L 9/08* (2006.01)

(52) U.S. Cl.
CPC ..... *H04N 1/00435* (2013.01); *H04N 1/00411* (2013.01); *H04N 1/00724* (2013.01); *G06K 9/00154* (2013.01); *H04L 9/0836* (2013.01); *H04N 1/32325* (2013.01); *H04N 2201/0094* (2013.01)

(58) Field of Classification Search
None
See application file for complete search history.

(56) References Cited

U.S. PATENT DOCUMENTS

| 4,731,860 A * | 3/1988 | Wahl | G06K 9/4633 |
| | | | 382/141 |
| 5,479,530 A | 12/1995 | Nair et al. | |
| 5,544,255 A | 8/1996 | Smithies et al. | |

(Continued)

FOREIGN PATENT DOCUMENTS

| CN | 101247222 | 8/2008 |
| KR | 20110053783 A | 5/2011 |
| WO | WO-2013002735 | 1/2013 |

OTHER PUBLICATIONS

Livecycle Digital Signatures, (Web Page), Oct. 25, 2010, 2 Pages, http://forums.adobe.com/thread/742892?start=0.

*Primary Examiner* — Benny Q Tieu
*Assistant Examiner* — Haris Sabah
(74) *Attorney, Agent, or Firm* — Fabian VanCott; Robert Sismilich

(57) ABSTRACT

A system comprising a multifunctional peripheral device in which the multifunctional peripheral device comprises a processor and a display device, in which the processor detects signature lines in an electronic document, and in which the display device of the multifunctional peripheral device displays the detected signature lines one at a time.

5 Claims, 4 Drawing Sheets

(56) References Cited

U.S. PATENT DOCUMENTS

| | | |
|---|---|---|
| 5,892,824 A | 4/1999 | Beatson et al. |
| 5,930,770 A | 7/1999 | Edgar |
| 7,542,160 B2 | 6/2009 | Parry et al. |
| 2005/0231746 A1* | 10/2005 | Parry ............... H04N 1/00352 358/1.13 |
| 2006/0081696 A1* | 4/2006 | Sakurai ............... G06Q 10/08 235/375 |
| 2009/0235082 A1* | 9/2009 | Garrett ............... H04L 9/3281 713/178 |
| 2009/0287779 A1* | 11/2009 | Haynes ............... G06Q 10/107 709/206 |
| 2010/0059330 A1* | 3/2010 | Georgens ............... G06Q 20/18 194/206 |
| 2010/0100743 A1* | 4/2010 | Ali ............... H04L 9/3247 713/176 |
| 2010/0177356 A1* | 7/2010 | Nam ............... G06K 15/02 358/3.06 |
| 2010/0275151 A1 | 10/2010 | Arakane |
| 2011/0096372 A1 | 4/2011 | Crucs |
| 2011/0116140 A1 | 5/2011 | Fry et al. |
| 2011/0164289 A1 | 7/2011 | Song et al. |
| 2011/0312380 A1* | 12/2011 | Bard ............... H04N 1/00307 455/557 |
| 2013/0083976 A1* | 4/2013 | Ragland ............... G06F 3/011 382/117 |
| 2013/0215078 A1 | 8/2013 | Bodnar et al. |
| 2013/0298014 A1 | 11/2013 | Kodimer et al. |
| 2015/0149899 A1* | 5/2015 | Bernstein ............... G06F 3/016 715/702 |

\* cited by examiner

MULTIFUNCTIONAL PERIPHERAL DEVICE DETECTING AND DISPLAYING SIGNATURE LINES WITHIN AN ELECTRONIC DOCUMENT

BACKGROUND

Multifunctional peripheral device (MFP device) incorporates the functionality of a number of devices such as a printer, a fax machine and a scanner. The combination of these devices into one device allows users to go to a single source to print, fax, copy, and scan materials. An MFP device allows a user to send information to the MPF device in order to print off the material, make copies of that material, and/or fax that material to another without having to make multiple trips from his or her seat or interface with more than a single device.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
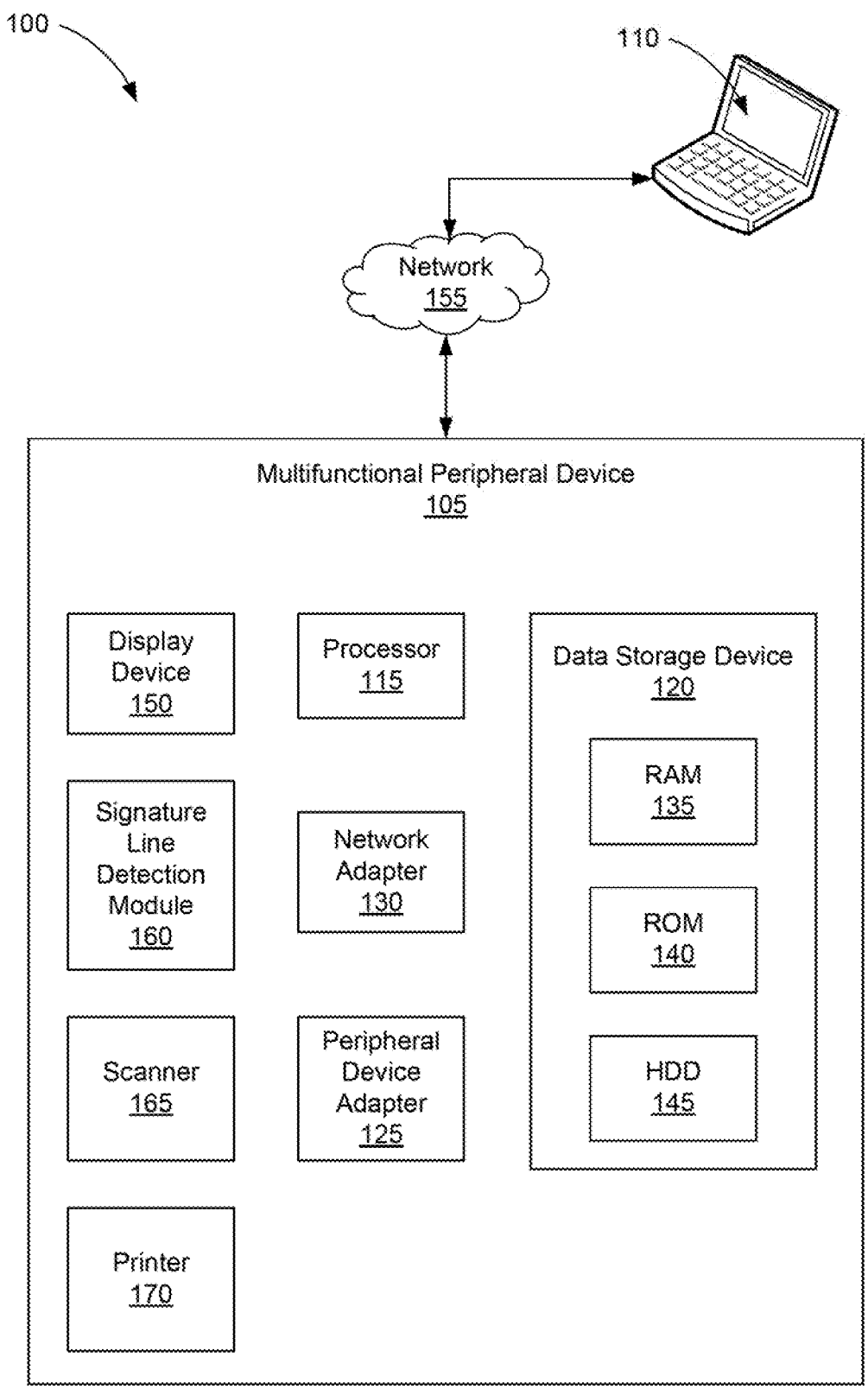
FIG. 1 is a block diagram of a system incorporating a multifunctional peripheral device (MFP device) for detecting signature line in a document according to one example of the principles described herein.

As described above, multifunctional peripheral devices (MFP devices) provide to a user the advantage of a "one-stop-shop" device where a user may make copies, scan documents, fax documents, and print off documents. Usually, the MFP device is the starting or ending point of a document workflow. With MFP devices the user is given limited ability to alter the documents scanned, faxed, or received by the MFP device. Where a user inputs a document to the MFP device, that document is printed off without the user being able to significantly alter the contents of the document including the text or images that appear on the documents. The user is also not allowed to delete pages of the document, but instead is left to print all of the pages regardless of the whether the user intended to have those pages printed. Still further, a user may not be allowed to alter a scanned document he or she has caused to be scanned by the MFP device. Even further, a user may not be allowed to alter the contents of a document that the user has attempted to fax.

The present specification, therefore, describes a system comprising a multifunctional peripheral device comprising a processor and a display device in which the processor detects signature lines in an electronic document and in which the display device displays the detected signature lines one at a time.

The present specification further describes a method of detecting signature lines within an electronic document with a multifunctional peripheral device, comprising receiving the electronic document at the multifunctional peripheral device, detecting signature lines in the electronic document, and displaying each detected signature line within the electronic document on a display device of the multifunctional peripheral device.

Even further, the present specification describes a computer program product for receiving edits to an electronic document, the computer program product comprising a computer readable storage medium comprising computer usable program code embodied therewith, the computer usable program code comprising computer usable program code to, when executed by a processor, computer usable program code to, when executed by a processor, receive the electronic document at a multifunctional peripheral device, computer usable program code to, when executed by a processor, detect signature lines within the electronic document, and computer usable program code to, when executed by a processor, display the signature lines on a display device of the multifunctional peripheral device.

As used in the present specification and in the appended claims, the term "multifunctional peripheral device" is meant to be understood broadly as any physical hardware that combines two or more devices or functions into a single device. Consequently, the multifunctional peripheral device may comprise two of either a printer, a scanner, a facsimile machine, a copier machine, emailing device or combinations thereof.

Additionally, as used in the present specification and in the appended claims, the term "electronic document" is meant to be understood broadly as any electronic media content that define, when printed onto a medium, a physical document.

Further, as used in the present specification and in the appended claims, the term "signature line" is meant to be understood as any line in the document where the user is to enter hand-written information. In one example, a "signature" comprises name signatures, initials, authorizations, dates, or other signatory information provided by a user.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a system (100) incorporating a multifunctional peripheral device (MFP device) (105) for detecting signature lines in a document according to one example of the principles described herein. The system (100) may include an electronic device (110). Examples of electronic devices (110) include servers, desktop computers, laptop computers, personal digital assistants (PDAs), mobile devices, smartphones, gaming systems, and tablets, among other electronic devices.

To achieve its desired functionality, the MFP device (105) comprises various hardware components. Among these hardware components may be a number of processors (115), a number of data storage devices (120), a number of peripheral device adapters (125), and a number of network adapters (130). These hardware components may be interconnected through the use of a number of busses and/or network connections. In one example, the processor (115), data storage device (120), peripheral device adapters (125), and a network adapter (130) may be communicatively coupled via a common bus within the MFP device (105).

The processor (115) may include the hardware architecture to retrieve executable code from the data storage device (120) and execute the executable code. The executable code may, when executed by the processor (115), cause the processor (115) to implement at least the functionality of detecting a signature line within an electronic document, receive input to scroll through a number of detected signature lines, and receive input indicating a signature is being written to the signatures lines. The executable code may, when executed by the processor (115), further cause the processor (115) to implement at least the functionality of detecting when a palm of a hand has touched the display device (150) and reject that touch as input to the display device (150). In the course of executing code, the processor (115) may receive input from and provide output to a number of the remaining hardware units.

The data storage device (120) may store data such as executable program code that is executed by the processor (115) or other processing device. As will be discussed, the data storage device (120) may specifically store computer code representing a number of applications that the processor (115) executes to implement at least the functionality described herein.

The data storage device (120) may include various types of memory modules, including volatile and nonvolatile memory. For example, the data storage device (120) of the present example includes Random Access Memory (RAM) (135), Read Only Memory (ROM) (140), and Hard Disk Drive (HDD) memory (145). Many other types of memory may also be utilized, and the present specification contemplates the use of many varying type(s) of memory in the data storage device (120) as may suit a particular application of the principles described herein. In certain examples, different types of memory in the data storage device (120) may be used for different data storage needs. For example, in certain examples the processor (115) may boot from Read Only Memory (ROM) (140), maintain nonvolatile storage in the Hard Disk Drive (HDD) memory (145), and execute program code stored in Random Access Memory (RAM) (135).

Generally, the data storage device (120) may comprise a computer readable medium, a computer readable storage medium, or a non-transitory computer readable medium, among others. For example, the data storage device (120) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (125, 130) in the MFP device (105) enable the processor (115) to interface with various other hardware elements, external and internal to the MFP device (105). For example, the peripheral device adapters (125) may provide an interface to input/output devices, such as, for example, display device (150), a mouse, a keypad (FIG. 2, 210), or a keyboard. The peripheral device adapters (125) may also provide access to other external devices such as an external storage device, a number of network devices such as, for example, servers, switches, and routers, client devices, other types of computing devices, and combinations thereof.

The display device (150) may be provided to allow a user of the MFP device (105) to interact with and implement the functionality of the system (100). The peripheral device adapters (125) may also create an interface between the processor (115) and the display device (150), a printer (170), scanner (165), or other media input/output devices. The network adapter (130) may provide an interface to other computing devices within, for example, a network (155), thereby enabling the transmission of data between, for example, the electronic device (110) and the MFP device (105) as well as other devices couple to or located within the network (155).

The signature line detection module (160) may, when executed by the processor (115), display the number of graphical user interfaces (GUIs) on the display device (150) associated with the executable program code representing the number of applications stored on the data storage device (120). The GUIs may include aspects of the executable code including presenting the electronic document to the user, detecting a number of signature lines within the electronic document, graphically showing those detected signature lines to the user, and providing various tools that may be used by the user to edit the electronic document by, for example, inserting a signature into the electronic document. The GUIs may display, for example, the electronic document sent to the MFP device (105) by a user. While accessing the electronic document, a portion of the graphical user interface (GUI) may further display various editing tools such as strikethrough, underline, bold, italicize, delete, insert table, insert page numbering, and insert bulleting, among others. Indeed, the GUI may include editing tools similar to those accessible to the user on an electronic device (110). In one example, the GUI may include editing tools similar to those accessible to a user of an electronic device (110) running Microsoft® Word®. Microsoft® Word® is a computer program sold by the Microsoft Corporation located at Redmond Wash. As mentioned above, the display device (150) may be a display device (FIG. 2, 205) such as that shown in FIG. 2. Further examples of display devices (150) include a computer screen, a laptop screen, a mobile device screen, a personal digital assistant (PDA) screen, and a tablet screen, each communicatively coupled to the MFP device (105). Examples of, the GUIs displayed on the display device (150), will be described in more detail below.

The MFP device (105) further comprises a number of modules used in the implementation of the system (100). The various modules within the MFP device (105) comprise executable program code that may be executed separately. In this example, the various modules may be stored as separate computer program products. In another example, the various modules within the MFP device (105) may be combined within a number of computer program products; each computer program product comprising a number of the modules.

Figure 2:
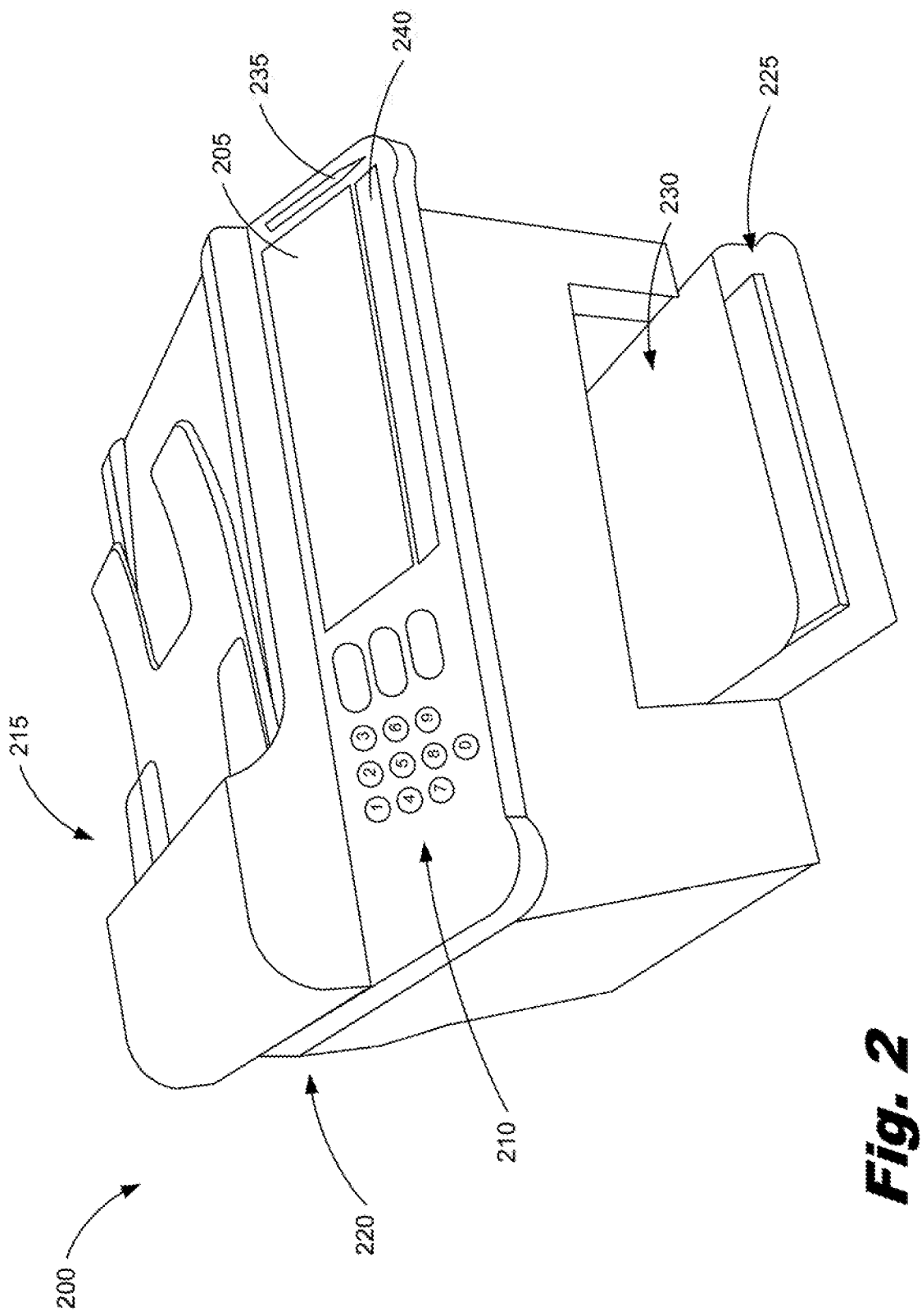
FIG. 2 is a diagram of a multifunctional peripheral device according to one example of the principles described herein.

FIG. 2 is a diagram of a multifunctional peripheral device (MFP device) (200) according to one example of the principles described herein. As discussed above, the MFP device may comprise a display device (205), a stylus (235), and a keypad (210). The display device (205) allows the user to interface with the MFP device (200). The display device (205) may be any device that allows a user of the MFP device (200) to view and edit an electronic document. Examples of an MFP device (105) comprise, a liquid crystal display (LCD), a cathode ray tube (CRT), a plasma panel, an electroluminescent panel, a light-emitting diode (LED) display, among others. In one example, the display device (205) may be an 800×600 resolution 8 inch display. In another example, the display device (205) is a multi-touch input device such as an infra red multi-touch panel.

The MFP device (200) may further include a keypad (210). The keypad (210) allows a user to hard-key in a number of letters and numbers so as to, for example, input a fax number. The MFP device (200) may, therefore, be communicatively coupled to a telephone system in order to fax the electronic documents to others.

The MFP device (200) may further include a stylus (235). The stylus may be used by the user of the MFP device (200) to interact with a graphical display displayed on the display device (205). In one example, the user may use the stylus to place a signature on a detected signature line within the electronic document as described below.

The MFP device (200) further comprises those features that allow the user to scan, copy, and print the electronic document after the user has made edits to or signed the electronic document. For example, the MFP device (200) may comprise a scanner (215). The scanner (215) may comprise a feed slot into which a user may insert a printed document and have the physical page scanned and converted into an electronic document. This electronic document may then be viewed and edited by the user via the display device (205) as described herein.

The MFP device (200) may further comprise a copier (220). The copier (220) may be a glass plane that is accessed by lifting a portion of the MFP device (200) that comprises the feed slot of the scanner (215). In one example, the charge-couple device used to scan a document with the scanner (215) may be similarly used to copy a document placed on the glass plane. Similar to above, the converted electronic document may be edited by the user via the display device (205) as described herein.

The MFP device (200) may further comprise a media supply unit (225) and a printed document discharge (230). The media supply unit (225) may provide a supply of, for example, paper to the MFP device (200) so that hard copies of an electronic document may be produced. The document discharge (230) may be a platform on which printed documents emerge from the MFP device (200) after the user has caused those documents to be printed.

During operation of the MFP device (200), a user may access an electronic document via the display device (205) and edit it by signing the electronic document in a number of locations. As briefly described above, the electronic document may be obtained by the MFP device (200) by either sending an electronic document from the electronic device (FIG. 1, 110) or by scanning or copying a hard copy of a document. If the electronic document is obtained from scanning or copying the hard document, the MFP device (200) may first convert the scanned text and images on the document into an editable format. For example, the text on the hard copy may be recognized optically by the MFP device (200) using optical character recognition.

The scanned image may comprise a number of signature lines. These signature lines may be detected by the MFP device (200) using the signature line detection module (FIG. 1, 160). The signature detection module uses a signature line detection process to detect all signature lines within an electronic document and, either automatically or by direction by a user, display all signature lines in a sequential manner so that the user may be able to place his or her signature on those lines. Once a user has added a signature to a line, the signature and any other edits made to the electronic document are saved as a new surface of the electronic document.

After an electronic document has been created by either scanning a hard copy of the document into the MFP device (200) or by the MFP device (200) receiving the electronic document the electronic document may have the orientation of each page rotated to a human readable orientation if not already correctly oriented. Rotating the pages this way may insure that all signature lines are detected by the signature line detection module (160).

Where a document has been scanned or where the electronic document is not a word processing document, after all the pages have been properly rotated, the content of all the pages, if scanned in color, may be transformed into greyscale representation. A sobel filtered image or contour map may then be generated from the image content. A sobel filter is an edge detection process that uses a number of kernels which are convolved with the original image to calculate approximations of the derivatives: one for horizontal changes, and one for vertical changes in the image. This approximates the corresponding image gradient in the image that is then used to produce a gradient approximation within the image content.

A contour map is map comprising a number of paths in an image along which the image intensity values are equal to a constant. In one example, the intensity values of each pixel within the grayscale image are mapped and each intensity is represented as a path within the grayscale image.

The resulting filtered image or contour map may then be subjected to a Hough transform. A Hough transform uses a two-dimensional array, called an accumulator, that detects the existence of a line described by:

$$r = x \cdot \cos\theta + y \cdot \sin\theta$$

where r is the distance between the line in an image and an origin on a cartesian coordinate system and 2 is the angle of the vector orthogonal to the line. The dimension of the accumulator equals the number of unknown parameters, for example, two, considering quantized values of "r" and "θ" in the pair (r,θ). For each pixel at (x,y) and its neighborhood, the Hough transform process determines if there is enough evidence of a straight line at that pixel. If so, it will calculate the parameters (r,θ) of that line, and then look for the accumulator's bin that the parameters fall into, and increment the value of that bin. By finding the bins with the highest values, for example by looking for local maxima in the accumulator space, the detected lines can be extracted, and their geometric definitions read off. A threshold bin value may be set such that the majority of false positive results are filtered out. In this case, the parameters are set such that lines within the electronic document that are lines but that are not signatures lines are not detected as such. Bounding regions around any particular horizontal line may also be taken into consideration when determining whether the horizontal lines are indeed signature lines. In one example, if subsequent data above or below the horizontal lines in the electronic document exist, then the horizontal line is rejected as being a signature line onto which a user is to place his or her signature.

In another example, if the electronic document was a result of a scanned hard copy of a document then optical character recognition software may be used in conjunction with the Hough transform to detect either general or specific text within the electronic document. In this case, a signature line that comprises no text above the horizontal line but that comprises text below the horizontal line may indicate a signature line that is to be signed by a specific person or entity. In this example, a user may so indicate his or her name, title, or company name, and the MFP device (200) may consider that information when determining whether the horizontal line is a signature line. Similarly, if the electronic document was received by the MFP device (200) from another electronic device (FIG. 1, 110) and had not been the result of a scanning operation of a hard copy, the data associated with the text of the electronic document may be considered in a similar way as described above.

In one example, the MFP device (200) may take into consideration the length of the horizontal line when running the Hough transform and detecting signature lines. In this example, a length may be set such that a deviation from a specific length beyond an allowable threshold, either longer or shorter, may indicate that the detected horizontal line is not a signature line. In one example, the threshold length may be one inch where any detected line above one inch is determined to not be a signature line while detected lines at or below one inch may be considered a signature line. Other examples may include various lengths set as a parameter after implementation of the Hough transform in order to limit the length of any detected horizontal line in the image. In another example, the set of potential signature lines indicated by the Hough transform may be further subjected to additional post-processing by other hardware or software to eliminate false positives. These post processes may also look at the surrounding areas, connections to other lines or structures, surrounding text, or other metrics to reduce the set to a final set of actual signature lines.

The resulting data created by the Hough transform may list the starting and ending point locations on the page of each horizontal line the MFP device (200) has predicted is a signature line. These starting and ending point locations form location data of each detected horizontal line that is considered a signature line and may be saved as metadata associated with the electronic document on the data storage device (FIG. 1, 120).

The display device (205) of the MFP device (200) will then be provided with the location data and scroll through each of the lines within the electronic document that the MFP device (200) has predicted as being signature lines. The image viewed on the screen may also be scaled up or down to best display the signature line for the user to see the whole line. This allows a user to be able to comfortably input their signature into the electronic document as well as other information. The GUI displayed by the display device (205) may comprise a forward and backward button by which a user may actuate such that a previous or a next detected signature line is shown. This allows a user to scroll through each detected signature line to determine visually if these lines have been signed.

Each of the detected signature lines may be displayed on the display device (205) such that they are positioned at the bottom of the display device (205). This allows a user to sign on the signature lines using the stylus (235) provided with the MFP device (200). This allows the user to sign on the signature lines without touching the display device (205). In one example, the user may select, via the display device, a right- or left-justification feature that places the signature line either the left or right side of the display device. The justification may be dependent on the left- or right-handedness of the user and may be set by the user using user preferences. In another example, the left- or right-justification may be dependent on the placement of the user's wrist on the bezel (240) or the placement of the bezel (240) with respect to the display device (205).

In one example, the MFP device (200) comprises a bezel (240) that is raised above the display device (205) for the user to rest his or her palm on while signing on the signature lines. This bezel (240) physically prevents a user's palm from coming in contact with the display device (205) and causing the display device to react in an unintended way. In another example, the MFP device (200) may be able to detect that a relatively large area of the display device (205) is being touched and reject that touch as an un-intentional touch.

In another example, the display device (205) may display each signature line highlighting that line in a different color. This allows a user to quickly see the signature line and begin signing on the line with the stylus (235) or his or her finger. Multiple colors may be used to indicate appropriate locations for multiple signatures. In one example, the multiple colors may indicate specific users are to sign on that signature line.

A firmware database may also be created on the data storage device (FIG. 1, 120) to store the new surfaces created by the placement of the user's signature by the user. Each page of the electronic document may, therefore, have an editing surface associated with it and each page may be stored with the editing surface on the data storage device (FIG. 1, 120). When the electronic document is digitally sent, stored, printed, or faxed, the electronic document will contain this new information defining the new image surfaces on top of the original electronic documents.

As described above, a signature may be generated by the user using the graphical user interface presented on the display device (205). In one example, a user may select a tool from a menu that allows him or her to, using a finger or the stylus (235), sign his or her signature on the display device (205) and securely save the signature on the data storage device (FIG. 1, 120) by associating the signature with a password and/or username. The user may later access the saved signature using the password and/or username. In one example, the user may be prompted to login to and logout of the MFP device (200). In this example, the login information comprising a username and password automatically allows that user access to the signature without having to provide the username and/or password again. In one example, the signature process may be backed by a service such as DocuSign®. Docusign® is a San Francisco company that sells electronic signature technology and document transaction management service for facilitating electronic exchanges of electronic documents. In other examples, other technologies may also be used such as Near-Field Communications (NFC) based devices, access card readers, dynamic security-code entry, or any other suitable method to authenticate the user at the device.

When the electronic document is signed, a document transaction management service may indicate that the document was signed by a user. The information will also provide the date and time of the signing as well as the specific name of the user who signed the electronic document. This provides a higher level of security such that a recipient of the signed electronic document may be able to verify via the document transaction management service that the document was signed by the appropriate user. This allows for two or more users to securely conduct business using an electronic document without the need to be physically present to verify that a document was signed by the appropriate user.

Figure 3:
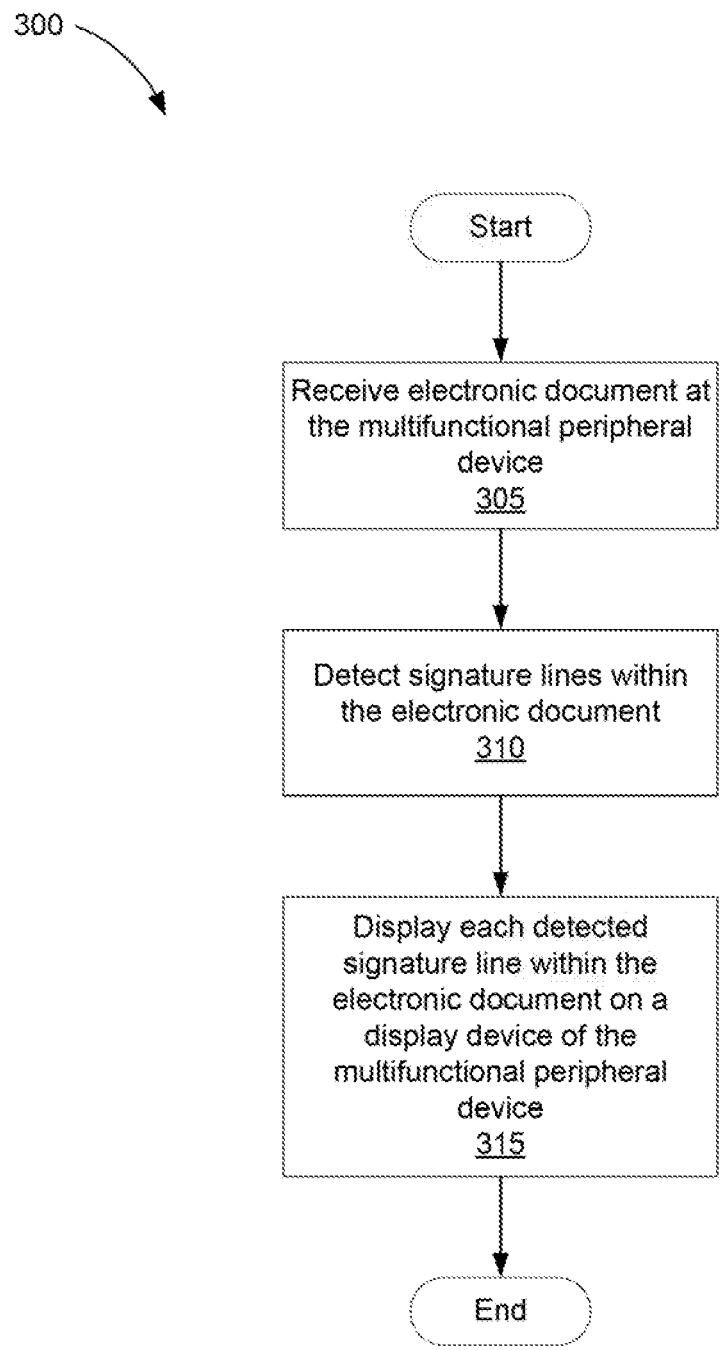
FIG. 3 is a flowchart showing a method of detecting signature lines within an electronic document with a multifunctional peripheral device according to one example of the principles described herein.

FIG. 3 is a flowchart showing a method (300) of detecting signature lines within an electronic document with a multifunctional peripheral device according to one example of the principles described herein. The method (300) may begin with receiving (305) an electronic document at the MFP device (FIG. 2, 200). As mentioned above, the electronic document may be received by the MFP device (FIG. 2, 200) after a document has been scanned by the MFP device (FIG. 2, 200), The MFP device (FIG. 2, 200) may then detect (310) signature lines within the electronic document. The detection of the signature lines of a scanned document may comprise implementing a number of processes that analyze the images of each page of the electronic document for recognizing patterns in the images. In one example, the pattern to be detected is horizontal lines. Where the electronic document is provided to the MFP device (FIG. 2, 200) via an electronic device (FIG. 1, 110), it may be in the form of a word processing document such as a .doc file. In this case, the MFP device (FIG. 2, 200) may detect horizontal lines in the electronic document using metadata that defines horizontal lines and that are associated with the word processing document.

The MFP device (FIG. 2, 200) may then display (315) each detected signature line within the electronic document on a display device (FIG. 2, 205) of the MFP device (FIG. 2, 200). As described above, a user may then scroll through the detected signature lines and apply a signature to the electronic document as described above.

Figure 4:
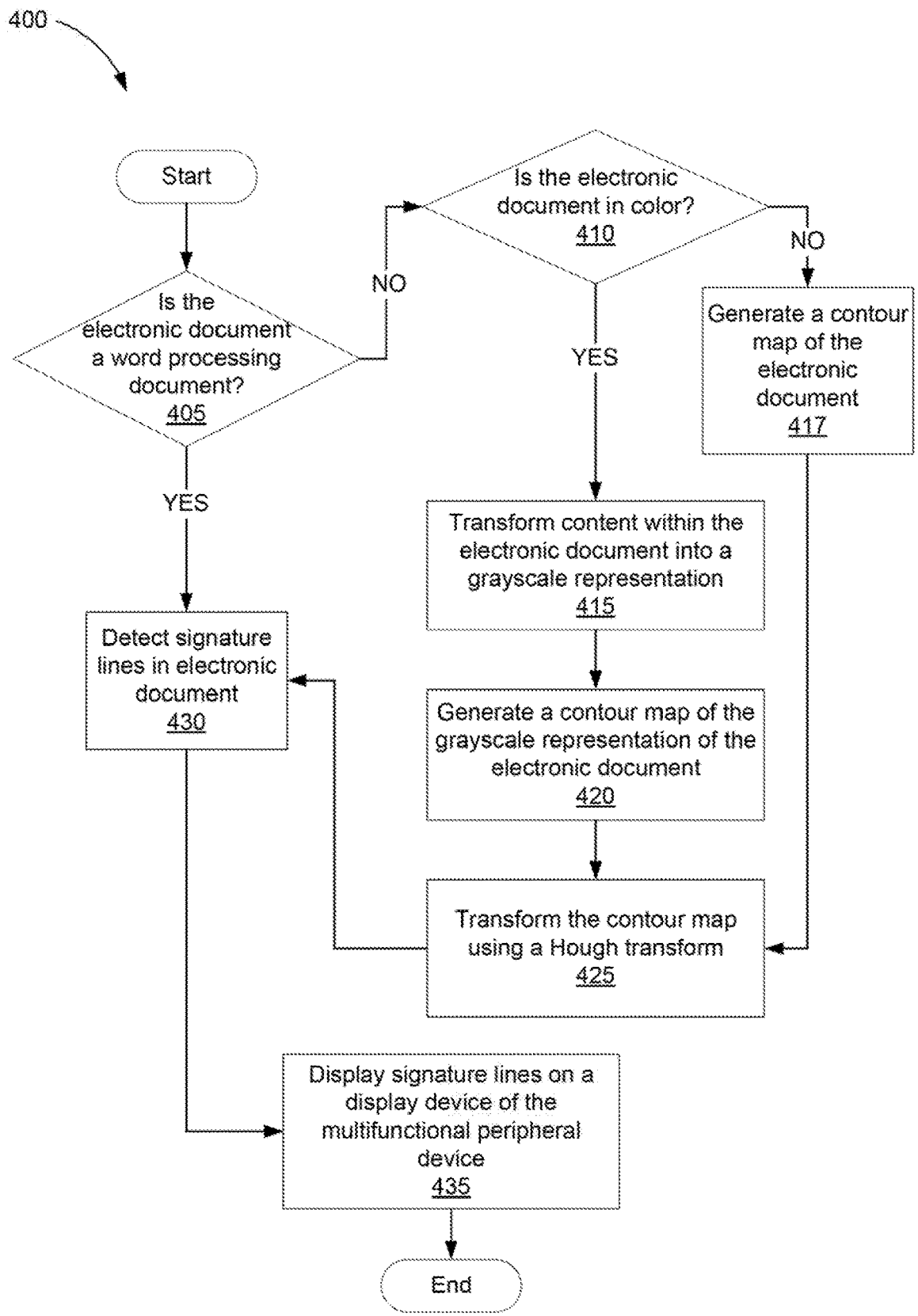
FIG. 4 is a flowchart showing a method of detecting signature lines within an electronic document with a multifunctional peripheral device according to another example of the principles described herein.

FIG. 4 is a flowchart showing a method (400) of detecting signature lines within an electronic document with a multifunctional peripheral device according to one example of the principles described herein. The method (400) may begin with determining (405) whether the electronic document is a word processing document. If the electronic document is a word processing document (Decision YES, 405), then the method (400) continues with detecting (430) signature lines in the electronic document as described above. In this example, the metadata associated with the word processing document may be used to detect (430) those lines defined therein. After the lines have been detected, the individual signatures lines may then be displayed (435) to the user of the MFP device (200) on the display device (205) as described above.

If it is determined that the electronic document is not a word processing document (Decision NO, 405) then the method may continue with the MFP device (FIG. 2, 200) determining (410) whether the electronic document is in color. If it is determined (Decision 410, NO) that the electronic document is not in color, the method (400) may continue by generating a countour map of the electronic document (417) and transforming (425) the contour map using the Hough transform described above. If it is determined (Decision 410, YES) that the electronic document is in color, then the method (400) may continue with the MFP device (FIG. 2, 200) transforming (415) content within the electronic document into a greyscale representation. As described above, the electronic document may be provided to the MFP device (FIG. 2, 200) by an electronic device (FIG. 1, 110) or by a scanner or copier of the MFP device (FIG. 2, 200) itself. Previous to the transformation of the electronic document into greyscale, the orientation of each page may be set to portrait as described above.

The method may continue with generating (420) a contour map of grayscale representation of the electronic document. The contour map may then be transformed (425) using a Hough transform and signature lines may be detected (420) in the electronic document as described above.

The individual signatures lines may then be detected (430) and displayed (435) to the user of the MFP device (200) on the display device (205). As described above, the view on the display device (205) of each signature line may be optimized by centering the signature line on the display device (205) and may additionally zoom in on the signature. In one example, a specific zoom factor is applied to the signature line such that the entire signature line fills the entire display device (205). Additionally, the view may be optimized by placing the detected line at the very most lower portion of the display device (205) so that a user's palm may not touch the display device (205).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (115) of the MFP device (105) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system to detect signature lines in an electronic document and display those lines on a display device (205) of the MFP device (200) for the user to apply a signature to. This system and an accompanying method may have a number of advantages, including quickly scrolling or sequencing through a number of signature lines within a document and signing a name on those lines. This provides the user with the ability to jump from one signature line to another signature line without advancing along the electronic document and without being presented with that text or imaging that appears between signature lines. Additionally, the system provides for a user to easily sign on the signature lines without touching the display device with a palm. As described above, this may be done physically through the bezel as well as electronically by the processor detecting the palm press and ignoring that press. In documents such as mortgage documents a relatively large number of signature lines may be detected. These lines may be presented to the user in a relatively quick fashion so that the user, after reading the document may quickly agree to content of the document by signing it using the system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:

a multifunctional peripheral device comprising:

a processor; and a display device;

in which the processor receives an electronic document and detects signature lines in the received electronic document; and in which the display device displays the detected signature lines one at a time at a left side or a right side of the display device based on detection by the multifunctional peripheral device of a left-handedness or a right-handedness of a user of the multifunction peripheral device, wherein the left-handedness or the right-handedness of the user is detected by a placement of a handwriting wrist of the user on a bezel of the display device.

2. The system of claim 1, wherein the multifunctional peripheral device further comprises a forward and backward control that, upon activation, scrolls through the detected signature lines.

3. The system of claim 1, wherein the electronic document is a non-color document, and wherein the processor detects the signature lines by generating a contour map of the electronic document and transforming the contour map using a Hough transform.

4. A system comprising:

a multifunctional peripheral device comprising:

a processor; and a display device;

in which the processor detects signature lines in an electronic document; and in which the display device displays the detected signature lines one at a time at a left side or a right side of the display device based on detection by the multifunctional peripheral device of a left-handedness or a right-handedness of a user of the multifunction peripheral device, wherein the left-handedness or the right-handedness of the user is detected by a placement of a bezel with respect to the display device.

5. The system of claim 4, wherein the electronic document is a color document, and wherein the processor detects the signature lines by transforming the color document to a grayscale document, generating a contour map of the grayscale document, and transforming the contour map using a Hough transform.

* * * * *